US010191915B2

(12) United States Patent
Fukatani et al.

(10) Patent No.: US 10,191,915 B2
(45) Date of Patent: Jan. 29, 2019

(54) INFORMATION PROCESSING SYSTEM AND DATA SYNCHRONIZATION CONTROL SCHEME THEREOF

(71) Applicant: Hitachi, Ltd., Tokyo (JP)

(72) Inventors: Takayuki Fukatani, Tokyo (JP); Masanori Takata, Tokyo (JP); Hitoshi Kamei, Tokyo (JP)

(73) Assignee: Hitachi, Ltd., Tokyo (JP)

(*) Notice: Subject to any disclaimer, the term of this patent is extended or adjusted under 35 U.S.C. 154(b) by 286 days.

(21) Appl. No.: 14/759,975

(22) PCT Filed: Feb. 19, 2013

(86) PCT No.: PCT/JP2013/053909
§ 371 (c)(1),
(2) Date: Jul. 9, 2015

(87) PCT Pub. No.: WO2014/128819
PCT Pub. Date: Aug. 28, 2014

(65) Prior Publication Data
US 2015/0358408 A1 Dec. 10, 2015

(51) Int. Cl.
*G06F 11/14* (2006.01)
*G06F 17/30* (2006.01)
*H04L 29/08* (2006.01)

(52) U.S. Cl.
CPC .... *G06F 17/30174* (2013.01); *G06F 11/1448* (2013.01); *H04L 67/104* (2013.01); *H04L 67/1097* (2013.01)

(58) Field of Classification Search
CPC ........................ H04L 67/1097; H04L 707/627
USPC .................... 707/E17.01, 627, 610; 709/204
See application file for complete search history.

(56) References Cited

U.S. PATENT DOCUMENTS

| | | | | |
|---|---|---|---|---|
| 5,319,780 | A | 6/1994 | Catino et al. | |
| 6,161,125 | A * | 12/2000 | Traversat | G06F 9/44505 707/999.01 |
| 7,085,779 | B2 | 8/2006 | Holtz et al. | |
| 7,127,472 | B1 * | 10/2006 | Enokida | G06F 17/30038 |
| 2008/0147747 | A1 | 6/2008 | Cardamore | |
| 2010/0223586 | A1 * | 9/2010 | Li | G06F 17/505 716/114 |
| 2012/0259813 | A1 * | 10/2012 | Takata | G06F 3/0608 707/622 |

(Continued)

FOREIGN PATENT DOCUMENTS

| | | | |
|---|---|---|---|
| JP | 2000-155710 | A | 6/2000 |
| JP | 2002-373101 | A | 12/2002 |
| JP | 2008-152772 | A | 7/2008 |

OTHER PUBLICATIONS

International Search Report of PCT/JP2013/053909.

*Primary Examiner* — Kevin T Bates
*Assistant Examiner* — Chen-Liang Huang
(74) *Attorney, Agent, or Firm* — Mattingly & Malur, PC

(57) ABSTRACT

In the present invention, in order to provide an effective synchronization process control method between sites in a multi-site file system sharing through a data center, a synchronization process target file group is split into sub trees of an appropriate size, in accordance with a conflict frequency of an update file between sites, and a throughput between site-data center. Then, the split sub tree is synchronized from the one having high conflict frequency.

7 Claims, 16 Drawing Sheets

(56) References Cited

U.S. PATENT DOCUMENTS

2013/0036106 A1* 2/2013 Lucas ............... G06F 17/30283 707/703
2013/0191350 A1* 7/2013 Esaka ............... G06F 17/30156 707/692

* cited by examiner

| FILE NAME (413A) | UPDATE TIME AND DATE (413B) | UPDATE TARGET (413C) | UPDATE CONTENT (413D) |
|---|---|---|---|
| /home/userA/FILE_A | 2010/11/30 10:00:00 | FILE | WRITE |
| /home/userB/DIR_B | 2010/11/30 11:00:00 | DIRECTORY | DELETE |
| /home/userB/FILE_C | 2010/11/30 11:00:00 | FILE | DELETE |
| /group/FILE_C | 2010/11/30 13:00:00 | FILE | RENAME SOURCE |
| /group/FILE_D | 2010/11/30 13:00:00 | FILE | RENAME DESTINATION |

| SITE | SYCHRONIZATION NUMBER | FILE NAME | UPDATE TIME AND DATE | UPDATE TARGET |
|---|---|---|---|---|
| B | 2 | /home/userA/FILE_A | 2010/11/29 12:00:00 | FILE |
| B | 2 | /home/userB/FILE_B | 2010/11/29 13:00:00 | FILE |
| C | 3 | /group/FILE_C | 2010/11/29 14:00:00 | FILE |
| C | 3 | /group/FILE_D | 2010/11/29 15:00:00 | FILE |

| SUB TREE NUMBER (415A) | EXCLUSIVE RANGE (415B) | FILE NAME (415C) | UPDATE TIME AND DATE (415D) | UPDATE TARGET (415E) | UPDATE CONTENT (415F) |
|---|---|---|---|---|---|
| 1 | /home/userA | /home/userA/FILE_A | 2010/11/30 10:00:00 | FILE | WRITE |
| 2 | /home/userB | /home/userB/FILE_B | 2010/11/30 11:00:00 | FILE | DELETE |
| 3 | /group | /group/FILE_C | 2010/11/30 13:00:00 | FILE | RENAME SOURCE |
| 3 | /group | /group/FILE_D | 2010/11/30 13:00:00 | FILE | RENAME DESTINATION |

| TOP DIRECTORY (416A) | USAGE (416B) | CONFLICT FREQUENCY (416C) | SYNCHRONIZATION TIME UPPER LIMIT (416D) | AVERAGE THROUGHPUT (416E) |
|---|---|---|---|---|
| home/* | USER | MEDIUM | 30 MINUTES | 4.2Mbps |
| group/* | GROUP SHARE | HIGH | 1 MINUTE | 1.6Mbps |
| archive | ARCHIVE | LOW | 8 HOURS | 4.5Mbps |
| backup | BACKUP | LOW | 8 HOURS | 4.3Mbps |
| group/team1/* | GROUP SHARE | HIGH | 30 SECONDS | 1.6Mbps |
| home/BS1993.txt | ARCHIVE | LOW | 8 HOURS | 1.6Mbps |

| SITE | SYCHRONIZATION NUMBER | FILE NAME | UPDATE TIME AND DATE | UPDATE TARGET | UPDATE CONTENT |
|---|---|---|---|---|---|
| A | 1 | /home/userA/FILE_A | 2010/11/28 21:00:00 | FILE | WRITE |
| A | 1 | /home/userB/Dir_B | 2010/11/28 21:00:00 | DIRECTORY | DELETE |
| A | 1 | /group/FILE_C | 2010/11/28 22:00:00 | FILE | RENAME SOURCE |
| A | 1 | /group/FILE_D | 2010/11/28 23:00:00 | FILE | RENAME DESTINATION |
| B | 2 | /home/userA/Dir_B | 2010/11/29 22:00:00 | DIRECTORY | WRITE |
| B | 2 | /home/userB/FILE_D | 2010/11/29 23:00:00 | FILE | WRITE |

| SUB TREE ROOT | LOCK OWNER | OBTAINED TIME AND DATE | RETENTION PERIOD |
| --- | --- | --- | --- |
| home/user_A | A | 2010/11/30 22:00:00 | 30 MINUTES |
| group/dir_A | B | 2010/11/30 23:00:00 | 1 MINUTE |

510

INFORMATION PROCESSING SYSTEM AND DATA SYNCHRONIZATION CONTROL SCHEME THEREOF

TECHNICAL FIELD

The present invention relates to streamlining a data synchronization process between file servers operating at a plurality of sites.

BACKGROUND ART

In recent years, computerization of information within companies are progressing, and it is a problem of an IT system to share massive files stored in each site between sites distributed geographically as fast as possible. As one method of solving the problem, there is a multi-site file system sharing via a data center, in which file servers of the sites share an identical file system, via the data center connected by a WAN (Wide Area Network).

For example, Patent Literature 1 discloses a system of enabling a file system in a NAS (Network Attached Storage) in one site to be referred as a read-only file system from NAS in other site, through a CAS (Content-Addressable Storage) device of a data center. In the present system, the original site performs a synchronization process to synchronize update contents periodically (for example, once every day) between the site and the data center. The other sites referring the original site offer the updated contents, by periodically reflecting the updated content in the data center to own site.

In the case where an update access is permitted to a plurality of sites in the multi-site file system sharing via the data center, there is a fear that the updates of differing contents collide (conflict) with respect to an identical file between the sites. In the case where a conflict happens, a conflict dissolving process which compares the update contents and decides which update should be remained as a newest version becomes necessary. For example, in Patent Literature 2, a method of performing the conflict dissolving at the time of data synchronization of the file system is disclosed.

Further, as a method for realizing exclusive control of the update process among a plurality of the sites, Patent Literature 3 discloses a system of providing exclusive control for a name space of a file system in sub tree granularities. The name space used herein is a managed storage object to manage files within the file system, and generally is a tree structure taking the directory as a node and a file as a leaf. Further, sub tree becomes a part of the tree structure of the file system.

CITATION LIST

Patent Literature

[PTL 1]
US Patent Application Publication No. 2012/0259813
[PTL 2]
U.S. Pat. No. 7,085,779
[PTL 3]
U.S. Pat. No. 5,319,780

SUMMARY OF INVENTION

Technical Problem

In the system disclosed in Patent Literature 1, in the case where the update access is permitted for the same file system to a plurality of the sites, there is a problem that consistency cannot be maintained between sites due to the conflict. Therefore, the conflict dissolving process at the time of synchronization process in Patent Literature 2 becomes necessary at the time of synchronization process between the site and the data center.

The conflict dissolving process in Patent Literature 2 carries out exclusive control for the synchronization process of updated contents in the sites to the data center in file system units. There is a problem that other sites cannot perform the synchronization process when one site is in the synchronization process, and a delay time of the synchronization process becomes large when the number of sites increases. This is because in the case a site synchronizes the updated contents to the data center while another site is synchronizing its updated contents, an adequacy of the result of the conflict dissolving process cannot be guaranteed.

It is possible to fine-grade the synchronization range of the file system into file granularities or directory granularities, by combining Patent Literature 3 with Patent Literatures 1 and 2. However, the exclusive control via WAN has large communication delay. In the case where the exclusive control range is fine-graded, the problem of the delay time of the synchronization process may be resolved, however a throughput of the synchronization drops because the exclusive control frequency increases. In contrast thereto, in the case where the exclusive range is expanded, the exclusive control frequency drops but it is not possible to resolve the problem of the delay time of the synchronization process.

The present invention has been made in view of these circumstances, and executes the synchronization process of the file system by splitting into sub trees of an appropriate size. By setting the exclusive range of the data center update process at the time of the synchronization process to the split sub trees, it becomes possible to perform a parallel processing of the synchronization process by a plurality of the sites, and to prevent delay of the synchronization process.

Means for Solving the Problem

In accordance with a conflict frequency between sites, an upper limit value of one synchronization process time is set. At the time of the synchronization process, a file system as a synchronization process target is split into sub trees, on the basis of average file size of the synchronization target, a throughput between the site and a data center, and the upper limit value of the synchronization process time. Further, the split sub trees are synchronized from the one having high conflict frequency. That is, the files with high conflict frequency having high possibility of being accessed by other sites is set as a small exclusive range, and the synchronization is performed preferentially, so as to shorten the synchronization delay time of these files. On the other hand, the files with low conflict frequency has low possibility of being accessed by the other sites, so that a high throughput is achieved by synchronizing large number of files at once. For example, for the files having large conflict such as group shared files, the delay time of the synchronization process is shortened by decreasing the number of files as the synchronization process target for one process, and for files with small conflict such as a user work files and archives, the high throughput is achieved by increasing the number of synchronization process target files for one process.

Advantageous Effects of Invention

With the present invention, it becomes possible to suppress an influence of an increase of the delay time while suppressing throughput degradation of the synchronization process, even in the case where the number of sites is increased, so that more sites may be supported.

BRIEF DESCRIPTION OF DRAWINGS

FIG. 5 is a view showing an example of a configuration of an own site update file list.

FIG. 6 is a view showing an example of the configuration of other site update file list.

FIG. 7 is a view showing an example of the configuration of a split synchronization file list.

FIG. 8 is a view showing an example of the configuration of a directory management table.

FIG. 9 is a view showing an example of the configuration of a synchronized file list.

FIG. 10 is a view showing an example of the configuration of a lock list.

DESCRIPTION OF EMBODIMENTS

Figure 1:
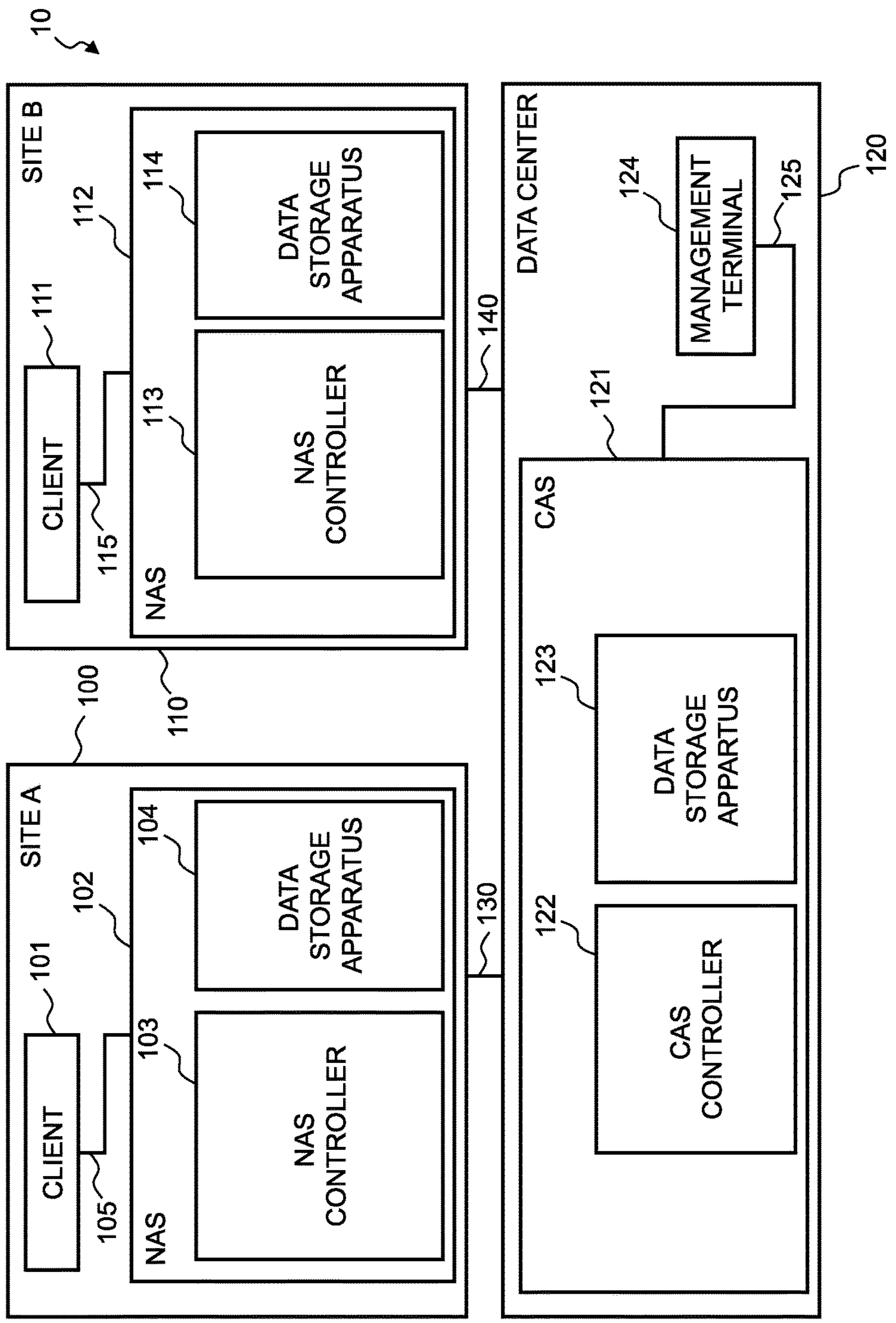
FIG. 1 is a view showing an example of a physical configuration of an information processing system according to the present invention.

The present invention is a technique for managing data in a storage system in an information processing system, and more specifically, relates to a technology of transferring data stored in NAS to CAS, and for synchronizing data between NASs.

Hereinafter, explanation will be given on an embodiment of the present invention with reference to the accompanying drawings.

In the drawings of the present specification, explanation is given on information used in the present invention taking an example of a table or a list. However, it is not limited to the information provided in the table structure or the list structure, and it may be information not relying on data structure.

Further in the embodiment of the present invention, a communication network between NAS and CAS is not limited to an adoption of a WAN, and it is possible to adopt other communication networks such as a LAN (Local Area Network). The embodiment of the present invention is not limited to an adoption of an NFS (Network File System) protocol, and it is possible to adopt other file sharing protocols including CIFS (Common Internet File System), HTTP (Hypertext Transfer Protocol), and the like.

In the present embodiment, the NAS is used as a storage device on a site side, however this is just an exemplification. It is possible to use, as the storage device on the site side, the CAS device, a distributed file system such as HDFS (Hadoop Distributed File System) and the like, and an object based storage. Further, the CAS device is used as the storage device of the data center, however this is just an exemplification. It is possible to use, in addition to the CAS device, for example the NAS device, the distributed file system, and the object based storage.

In the following explanation, explanation of each process may be made taking "program" as a subject. However, the program performs a given process using a memory and a communication port (communication control device) by being executed by a processer, so that the explanation may be made taking the processer as the subject. Further, the process disclosed taking the program as the subject may be a process performed by a computer or an information apparatus such as a management server. A part of or all of the program may be realized by a special purpose hardware, or may be modularized. Various programs may be installed into each computer by a program distribution server or a storage media.

(1) First Embodiment

<Physical Configuration of System>

FIG. 1 is a block diagram showing an example of a physical configuration of an information process system according to an embodiment of the present invention. In FIG. 1, only sites A and B are shown. However, more sites may be included in the system, and it is possible to configure each site similarly.

An information processing system 10 includes one or a plurality of sub computer systems 100 and 110 arranged in each site, and a data center system 120 configured from a CAS device 121, and each of the sub computer systems 100 and 110 and the data center system 120 are connected via networks 130 and 140.

The sub computer systems 100 and 110 include clients 101 and 111, and NAS devices 102 and 112, that are connected by networks 105 and 115. The clients 101 and 111 are one or a plurality of computers using a file sharing service provided by the NAS devices 102 and 112. The clients 101 and 111 use the file sharing service provided by the NAS devices 102 and 112, using a file sharing protocol such as a NFS and a CIFS, and via the networks 105 and 115.

Further, an administrator accesses a management interface provided by the NAS devices 102 and 112 from the clients 101 and 111, and performs management of the NAS devices 102 and 112. Such management includes, for example, starting operation of a file server, stopping of the file server, creating and exporting a file system, management of an account of the clients 101 and 111, and the like. Hereinafter, a plurality of NAS devices 102 are, in some cases, collectively referred to simply as NAS device 102.

The NAS devices 102 and 112 include NAS controllers 103 and 113, and data storage apparatuses 104 and 114. The NAS controllers 103 and 113 provide the file sharing service to the clients 101 and 111, and include a cooperation function with the CAS device 121. The NAS controllers 103 and 113 store various files and file system configuration information created by the clients 101 and 111 to the data storage apparatuses 104 and 114.

The data storage apparatuses 104 and 114 provide a volume to the NAS controllers 103 and 113, and are places where the NAS controllers 103 and 113 store the various files and file system configuration information. The volume referred to here is a logical storage area associated with a physical storage volume. Further, the file referred to here is a management unit of data, and the file system is a management information for managing the data within the volume. Hereinafter, the logical storage area within the volume managed by the file system is, in some cases, referred simply to as a file system.

The data center system 120 includes the CAS device 121 and a management terminal 124, that are connected by a network 125. The CAS device 121 is a storage device of an archive and a backup destination of the NAS devices 102 and 112. The management terminal 124 is a computer that the administrator of the information processing system 10 uses.

The administrator performs management of the CAS device 121 from the management terminal 124 through the network 125. Such management includes, for example, creating the file system allocated to the NAS devices 102 and 112. The management terminal 124 includes an input/output device. As an example of the input/output device, a display, a printer, a keyboard, a pointer device are conceivable. However, the input/output device may be devices other than the above (for example, a loudspeaker, a microphone and the like). Further, as a substitute for the input/output device, it may be of a configuration of setting a serial interface as the input/output device, and connecting a computer for display including a display or a keyboard or a pointer device to the interface. In this case, the input and the display at the input/output device may be substituted by performing display or accepting input by the computer for display, by transmitting information for display to the computer for display, and receiving information for input from the computer for display.

The network 105 is a LAN within a site of a site A 100, the network 115 is a LAN within a site of a site B 110, the network 125 is a LAN within a data center of the data center system 120, the network 130 is a WAN network connecting between the site A 100 and the data center system 120, and the network 140 is a WAN network connecting between the site B 110 and the data center system 120. The type of network is not limited to the above networks, and various networks may be used.

<Logical Configuration of System>

Figure 2:
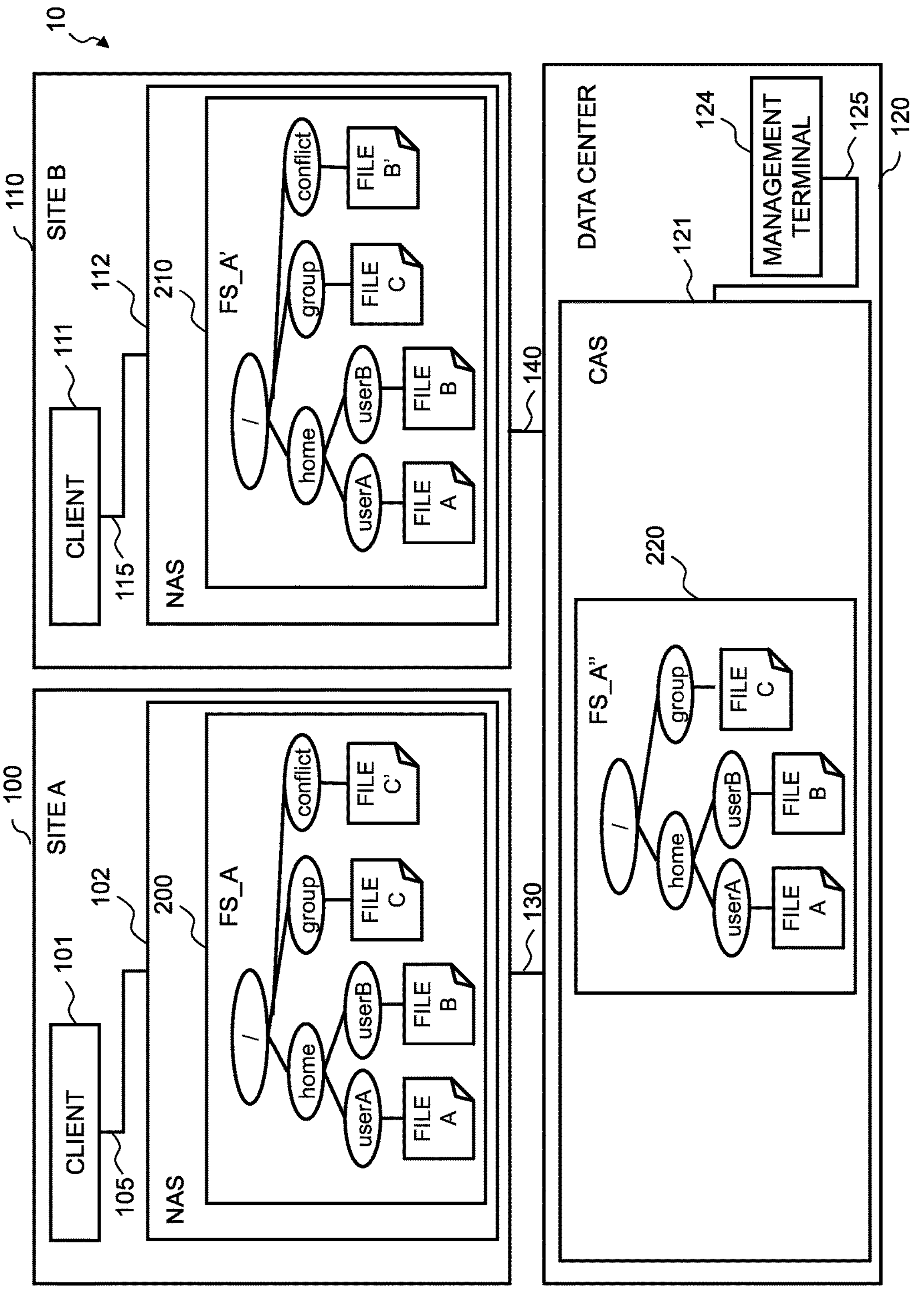
FIG. 2 is a view showing an example of a logical configuration of the information processing system according to the present invention.

FIG. 2 is a block diagram showing an example of a logical configuration of the information process system according to the embodiment of the present invention.

Data that the client 101 of the site A 100 in the information processing system 10 reads and writes is stored in a file system FS_A200 created by the NAS device 102 as a file. Similarly, in the site B110, data that the client 111 reads and writes is stored in a file system FS_A'210 created by the NAS device 112 as a file. In these file systems, a specific directory is exported to the clients 101, 111. The directory is a management storage object for hierarchy managing a plurality of files, and is managed by the file system. The administrator specifies a usage of the directory when exporting the directory to the clients 101 and 111. For example, a user directory in the figure becomes a directory for storing user working files of a user, and a group directory becomes a directory used for group share usage.

The file stored in the file system FS_A200 and the file system FS_A'210 is synchronized to the data center system 120 with a certain trigger (a predetermined or an arbitrary timing, for example, a batch job at night). A file system FS_A"220 created by the CAS device 121 is a file system associated with the file system FS_A200 of the site A and the file system FS_A'210 of the site B.

The file system FS_A200 and the file system FS_A'210 mutually reflect update content, by periodically performing synchronization process with the file system FS_A"220 of the CAS device. At this time, in the case where the update content of own site conflicts with the update content of other site, and the update content of the other site is given priority, the corresponding file is backed up to a conflict file backup directory (a conflict directory in the figure). The details of this synchronization process will be explained with the explanation on FIG. 12.

<Internal Configuration of NAS Device>

Figure 3:
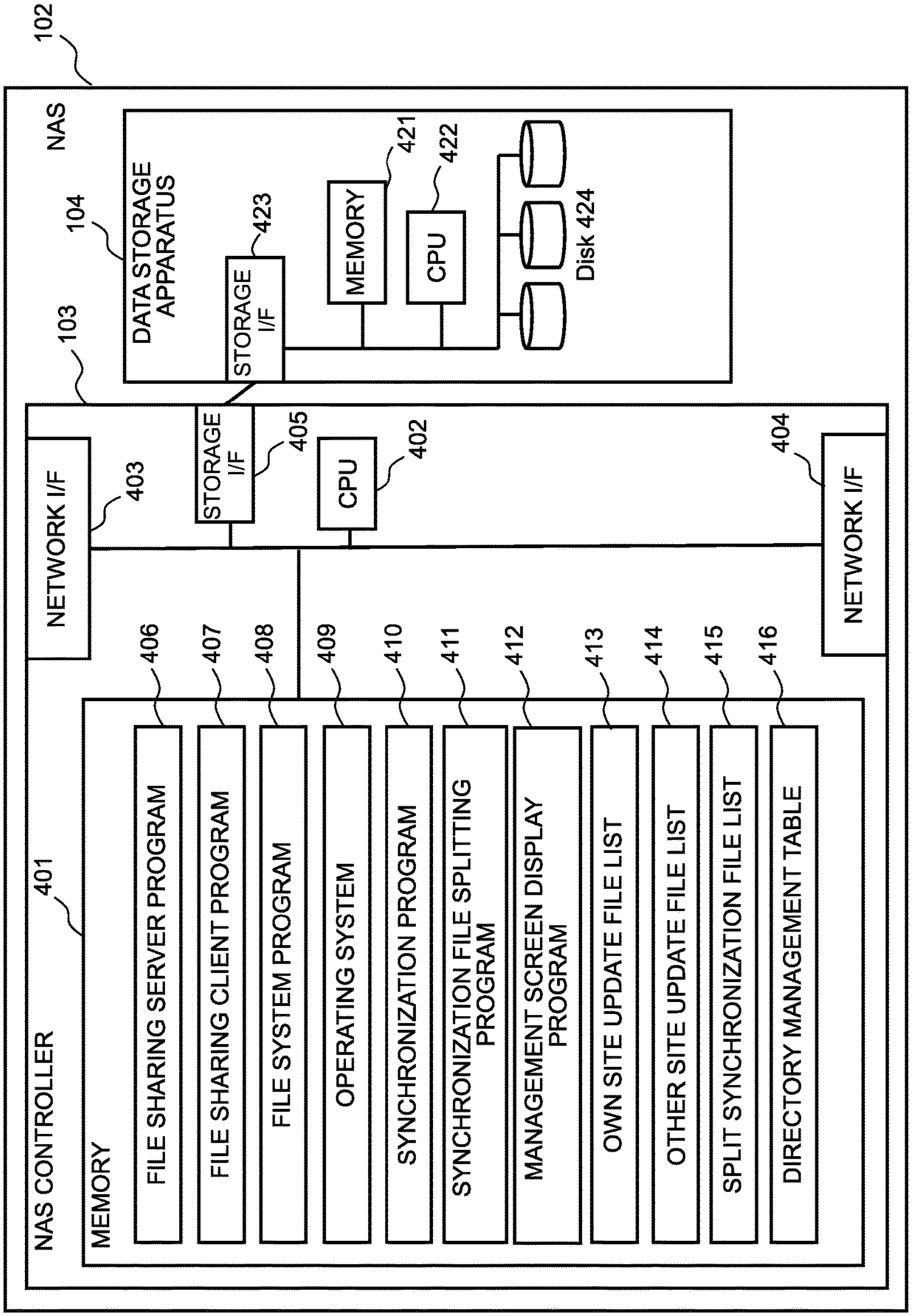
FIG. 3 is a view showing a hardware and software configuration of a NAS device.

FIG. 3 is a block diagram showing an example of an internal configuration the NAS device 102. The NAS device 112 of the site B 110 has a similar configuration. The NAS device 102 includes the NAS controller 103 and the data storage apparatus 104.

The NAS controller 103 is mounted with a CPU 402 which executes a program stored in a memory 401, a network interface 403 used for communication with the client 101 through the network 105, a network interface 404 used for communication with the data center system 120 through the network 130, a storage interface 405 used for connection with the data storage apparatus 104, and the memory which stores programs and data, that are connected by an internal communication channel (for example, a bus).

The memory 401 stores a file sharing server program 406, a file sharing client program 407, a file system program 408, an operating system 409, a synchronization program 410, a synchronization file splitting program 411, a management screen display program 412, an own site update file list 413, the other site update file list 414, a split synchronization file list 415, and a directory management table 416. Each programs 406 through 412, each file list, and tables 413 through 416 stored in the memory may be stored in the data storage apparatus 104, and be read to the memory 401 and executed by the CPU 402.

The file sharing server program 406 is a program which provides a means for the client 101 to perform a file operation to the file on the NAS device 102. The file sharing client program 407 is a program which provides a means for the NAS device 102 to perform the file operation to the file on the CAS device 121, and the NAS device in each site is capable of performing a predetermined file operation to the file of the own site and the other site on the CAS device 121 with the file sharing client program 407.

The file system program 408 controls the file system FS_A200. The operating system 409 includes an input/output control function, a read/write control function to data storage apparatus such as a disk and a memory, and provides these functions to the other programs.

The synchronization program 410 executes the synchronization process of the file between the NAS device 102 and the CAS device 121. The synchronization file splitting program 411 splits a file group that is called from the synchronization program 410 and that becomes a synchronization target into a plurality of sub trees. The management screen display program 412 controls a management screen of the synchronization process. The administrator is capable of accessing the management screen provided by the management screen display program 412 via the client 101.

An own site update file list 413 is a list for the NAS device 102 to manage a file update process of the own site. Further the other site update file list 414 is a list for the NAS device 102 to manage an update information of file at the other site. The split synchronization file list 415 is a list for the NAS device 102 to split the file group of the synchronization process target of the own site into sub tree granularities, and to manage the same.

The details of each file list will be explained later with the explanation on FIG. 5 through FIG. 7. The directory management table 416 is a table for managing a usage of the stored file and a conflict frequency, for each directory exported to the client 101. The details of the directory management table 416 will be explained later with the explanation of FIG. 8.

The data storage apparatus 104 is mounted with a storage interface 423 used for connection with the NAS controller 103, a CPU 422 which executes commands from the NAS controller 103, a memory 421 which stores programs and data, and one or a plurality of disks 424, that are connected by an internal communication channel (for example, a bus). The data storage apparatus 104 provides a storage function of a block form such as a FC-SAN (Fibre Channel Storage Area Network) to the NAS controller 103.

<Internal Configuration of CAS Device>

Figure 4:
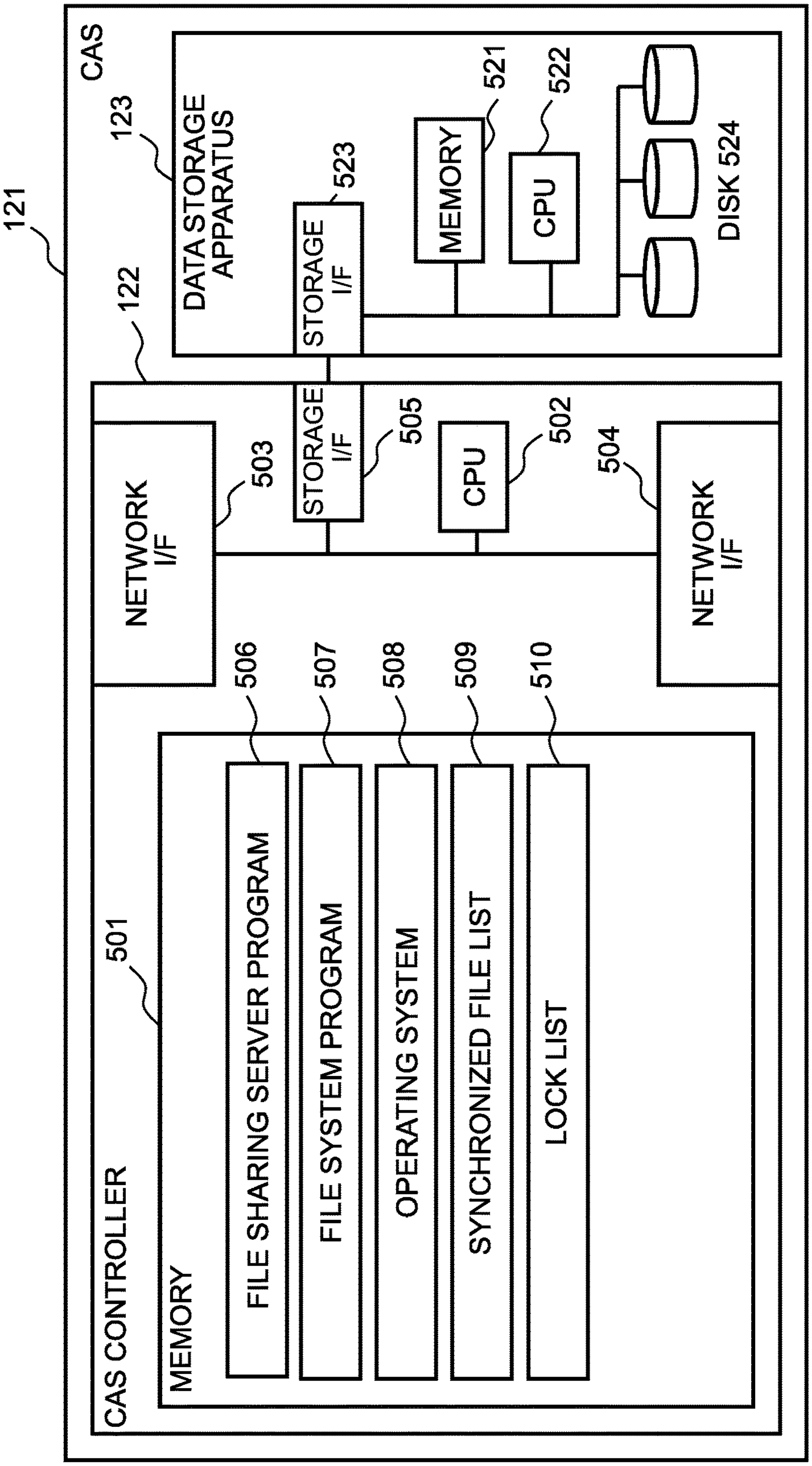
FIG. 4 is a view showing the hardware and software configuration of a CAS device.

FIG. 4 is a block diagram showing an example of an internal configuration of the CAS device 121. The CAS device 121 includes a CAS controller 122 and a data storage apparatus 123.

The CAS controller 122 is mounted with a CPU 502 which executes a program stored in a memory 501, a network interface 503 used for communication with the NAS devices 102 and 112 through the networks 130 and 140, a network interface 504 used for communication with the management terminal 124 through the network 125, a storage interface 505 used for connection with the data storage apparatus 123, and the memory 501 which stores programs and data, that are connected by an internal communication channel (for example, a bus).

The memory 501 stores a file sharing server program 506, a file system program 507, an operating system 508, a synchronized file list 509, and a lock list 510. Each programs 506 through 508, and lists 509 through 510 may be stored in the data storage apparatus 123, and be read to the memory 501 and executed by the CPU 502.

The file sharing server program 506 is a program which provides a means for the NAS devices 102 and 112 to perform a file operation to the file on the CAS device 121. The file system program 507 controls the file system FS_A"220. The operating system 508 provides an input/output control function, and a read/write control function to data storage apparatus such as a disk and a memory, to the other programs. The synchronized file list 509 is a list for managing the update process of the file performed by the NAS device 102 and the NAS device 112 with the synchronization process. The lock list 510 is a list for managing the sub tree of the file system the FS_A"220, to which a lock is obtained by the NAS device 102 and the NAS device 112.

The data storage apparatus 123 is mounted with a storage interface 523 used for connection with the CAS controller 122, a CPU 522 which executes a command from the CAS controller 122, a memory 521 which stores programs and data, and one or a plurality of disks 524, that are connected by an internal communication channel (for example, a bus). The data storage apparatus 123 provides a storage function of a block form such as the FC-SAN (Fibre Channel Storage Area Network) to the CAS controller 122.

<Own Site Update File List>

FIG. 5 is a view showing an example of a configuration of the own site update file list 413 of the NAS device 102. The NAS device 112 manages similar own site update file list 413.

The own site update file list 413 includes a file name 413A, an update time and date 413B, an update target 413C, and an update content 413D as configuration items.

Each entry of the own site update file list 413 corresponds to an update process to the file or the directory generated in the NAS device 102.

The file name 413A is an identification information which identifies the file and the directory as the update target, and includes a path of the file or the directory. The path used herein is a character string for indicating a location of the file or the directory in the file system. In the path, all directories from a root of the file system sequentially to the corresponding file or directory are listed.

The update time and date 413B is an information showing a time and date when the file or the directory is updated. The update target 413C is an information showing an update target, and either one of the file and the directory is included. The update content 413D is an updated content performed to the updated file, and any one of write, delete, rename source, and rename destination is specified. The write used herein includes an operation of increasing or decreasing the file in the directory.

The own site update file list 413 is newly created at a timing when the NAS device 102 performs the synchronization process. That is, the own site update file list 413 is a list of the update process generated after the synchronization process lastly performed.

By the own site update file list 413, it is possible for the NAS device 102 to manage the update process generated in the own site after the previous synchronization process. As a result, it becomes possible for the NAS device 102 to notify the update process generated in the own site to the CAS device 121, and eventually to the other site.

<Other Site Update File List>

FIG. 6 is a view showing an example of a configuration of the other site update file list 414 of the NAS device 102. The NAS device 112 manages similar other site update file list 414.

Each entry of the other site update file list 414 corresponds to the file updated in the other site. The other site update file list 414 includes a site 414A, a synchronization number 414B, a file name 414C, an update time and date 414D, and an update target 414E.

The site 414A is an information showing a site name where the update is generated. The synchronization number 414B is an identifier for uniquely showing the synchronization process executed by the NAS device 102 to all the NAS devices 102 in chronological order. At the time of the synchronization process, the NAS device 102 uses a number obtained by adding 1 to the latest synchronization number as the synchronization number 414B. The file name 414C is an information showing a path of the updated file. The update time and date 414D is an information showing a time and date when the update is generated in the other site. The update target 414E is an information showing an update target, and includes either one of the file or the directory.

At the time of the synchronization process, the NAS device 102 acquires the update content of the other site from the synchronized file list 509 of the CAS device 121, and adds the updated file in the other site to the other site update file list 414. At the time of access to the file listed in the other site update file list 414, the NAS device 102 performs process of acquiring the latest file from the CAS device 121.

By the other site update file list 414, it becomes possible to acquire the updated file generated in the other site according to need, at the time of access from the client 101. As a result, it becomes possible for the NAS device 102 to make the update file of the other site immediately accessible to the client 101, without reading all of the update files from the CAS device 121. A reflection process of the update file of the other site using the other site update file list 414 is an exemplification. For example, the present invention is applicable to a synchronization scheme of transferring the update file to the CAS device 121 at each synchronization process of the NAS device 102.

<Split Synchronization File List>

FIG. 7 is a view showing an example of a configuration of the split synchronization file list 415 of the NAS device 102. The NAS device 112 manages similar split synchronization file list 415.

Each entry of the split synchronization file list 415 corresponds to the update process generated in the own site from the previous synchronization process to a newly executed synchronization process. The split synchronization file list 415 includes the sub tree number 415A, an exclusive range 415B, a file name 415C, an update time and date 415D, an update target 415E, and an update content 415F as configuration items.

The sub tree number 415A indicates an identification number for uniquely identifying the sub tree in the split synchronization file list 415. The exclusive range 415B indicates an exclusive range necessary at the time of synchronizing the sub tree where the corresponding update process is generated. The exclusive range 415B includes the path of the root directory of one or more sub trees as exclusive control target. The file name 415C is an information showing the path of the file or the directory as the process target of the corresponding update process. The update time and date 415D indicates a time and date when the corresponding update process is performed. The update target 415E is an information showing whether the updated content is the file or the directory. The update content 415F is an update content performed to the update file, and any one of write, delete, rename source, and rename destination is specified.

At the time of synchronization process, the NAS device 102 creates a replication of the own site update file list 413 (hereinafter referred to as an own site update file list replication). Thereafter, the NAS device 102 splits the update process included in the own site update file list replication into sub tree granularities, and creates the split synchronization file list 415.

As seen from above, it becomes possible to split the update process into sub trees, and execute the synchronization process in sub tree granularities, by the split synchronization file list 415.

<Directory Management Table>

FIG. 8 is a view showing an example of a configuration of the directory management table 416 of the NAS device 102. The NAS device 112 manages similar directory management table 416.

Each entry of the directory management table 416 corresponds to the sub tree with the usage set by the administrator. The directory management table 416 includes a top directory 416A, a usage 416B, a conflict frequency 416C, a synchronization time upper limit 416D, and an average throughput 416E as configuration items.

The top directory 416A is an information showing a path of a top directory of the sub tree as a control target of the synchronization process. A path of an exported directory, or an arbitrary directory or file set by the administrator, may be set as the top directory 416A. In the case where "* (an asterisk)" is included in the path of the top directory 416A, the content of the corresponding entry is applied to all of the directories including the path coinciding with the path except for "*".

The usage 416B is an information indicating the use of the file under the top directory 416A, and either one of user, group share, archive, and backup is specified. The usage 416B is specified by the administrator via an exported directory setting interface explained later, at the time of exporting the directory.

The conflict frequency 416C is an information showing a conflict frequency at the time of synchronization process. A defined value of a conflict frequency 416C set preliminarily is set for the usage 416B. For example, in the case of a user usage, the conflict frequency is "low", and in the case of the group share, the value becomes "high".

The synchronization time upper limit 416D becomes an upper limit of a process time for one synchronization process with respect to the corresponding top directory. In the synchronization split process explained later, the NAS device 102 decides a size of the sub-tree as the synchronization process target, so as to satisfy the synchronization time upper limit 416D. Similarly to the conflict frequency 416C, a defined value of the synchronization time upper limit 416D set preliminary is set to the usage 416B. The average throughput 416E is an information showing a throughput of the synchronization process of the corresponding directory. In the case where the synchronization process to the corresponding directory is generated in the synchronization process, the NAS device 102 recalculates the average throughput, and rewrites the average throughput 416E with the calculation result. The recalculation of the average throughput may be performed with a statistics information accumulated from the past so as to reflect a long-term trend, or may be performed with a statistics information of past five times, for example, in order to grasp a recent trend. Further, the conflict frequency 416C may be changed and set on the basis of the statistics information, or an average value thereof may be set.

By the directory management table, it becomes possible to manage requirement of the synchronization process for each directory, and to formulate sub tree of an appropriate size according to the usage of the file at the time of synchronizing process. In the present embodiment, the usage 416B, the conflict frequency 416C, or the synchronization time upper limit 416D are set with respect to the top directory 416A. However, it is not limited thereto. For example, the usage 416B, the conflict frequency 416C, or the synchronization time upper limit 416D may be set to directory granularities or file granularities other than the top directory.

Further, the specification content of the usage 416B explained above is merely an exemplification, and it is possible to designate other usages.

<Synchronized File List>

FIG. 9 is a view showing an example of a configuration of the synchronized file list 509 of the CAS device 121.

Each entry of the synchronized file list 509 corresponds to the update process executed with respect to the CAS device 121 by the synchronization process of the NAS device 102. These update processes are recorded in order performed by the CAS device 121.

The synchronized file list 509 includes a site 509A, a synchronization number 509B, a file name 509C, an update time and date 509D, an update target 5009E, and an update content 509F as configuration items.

The site 509A is an information showing a site name where the update process is performed. The synchronization number 509B is, similarly to the synchronization number 414B, an identifier for uniquely identifying the synchronization process over all NAS devices 102 and over time. The file name 509C indicates a path of a file or a directory as the update target. The path stored in the file name 509C is the path of the FS_A"220 of the CAS device 121 at the time of executing the update process. The update time and date 509D is an information showing a time and date when the updated process is generated in the NAS device 102. The update target 509E is an information showing whether the updated content is the file or the directory. The update content 509F is a content of the update process, and any one of write, delete, rename source, and rename destination is specified.

At the time of synchronization process, the NAS device 102 executes the update process corresponding to the update process generated in the own site with respect to the CAS device 121, and adds the content thereof to the synchronized file list 509. That is, the update process generated in the NAS device 102 is recorded in the chronological order in the synchronized file list 509.

Further, these update processes are recorded not as the update process of the NAS device 102 itself, but as the update process with respect to the FS_A"220 of the CAS device 121. For example, in the case where the file as the update target is stored in the FS_A"220 of the CAS device 121 with a different path by a rename process by the other site, the NAS device 102 records the update process with respect to the path after rename in the synchronized file list 509.

As is explained above, by the synchronized file list 509, it becomes possible for the NAS device 102 to record the update process generated in the own site in the CAS device 121, and to notify to the NAS device 102 of the other side.

<Lock List>

FIG. 10 is a view showing an example of a configuration of the lock list 510 of the CAS device 121.

Each entry of the lock list 510 corresponds to the sub tree in the FS_A"220 of the CAS device 121 which becomes the exclusive control target at the time of synchronization process. In the case where the sub tree is listed in the lock list 510, the NAS device 102 cannot execute the synchronization process with respect to the sub trees including the corresponding sub tree.

The lock list 510 includes a sub tree root 510A, a lock owner 510B, an obtainment time and date 510C, and a retention period 510D as configuration items.

The sub tree root 510A is an information showing a top directory of the sub tree as the exclusive control target. In the case where not the sub tree but a file alone is the exclusive control target, this becomes an information showing a path of the corresponding file. The lock owner 510B is an information showing the NAS device 102 which obtained the lock, and shows an identifier (host name and the like) for uniquely indicating the NAS device 102 in the system. The obtainment time and date 510C is an information showing a time and date when the lock is obtained. The retention period 510D is an information showing a valid term of the lock after lock obtainment.

The NAS device 102 adds (locks) an entry to the lock list 510 when performing the synchronization process, and deletes (unlocks) the same after the synchronization process. At the time of synchronization of the sub tree, in the case where the sub tree to which other NAS device obtained the lock exists in the corresponding sub tree, the NAS device 102 does not execute the synchronization process. Further, in the case where the NAS device 102 which obtained the lock does not extend the lock period (overwrite the obtainment time and date 510C) or does not unlock, even after the retention period 510D, the lock becomes invalid. This is for preventing a situation where other NAS devices 102 cannot execute the synchronization process permanently, in the case where a failure is generated in the NAS device 102 which obtained the lock and the NAS device 102 could not recover within the retention period.

With the lock list 510, it becomes possible to exclude sub tree granularities in the synchronization process between the NAS devices 102

<File Read/Write Process>

Figure 11:
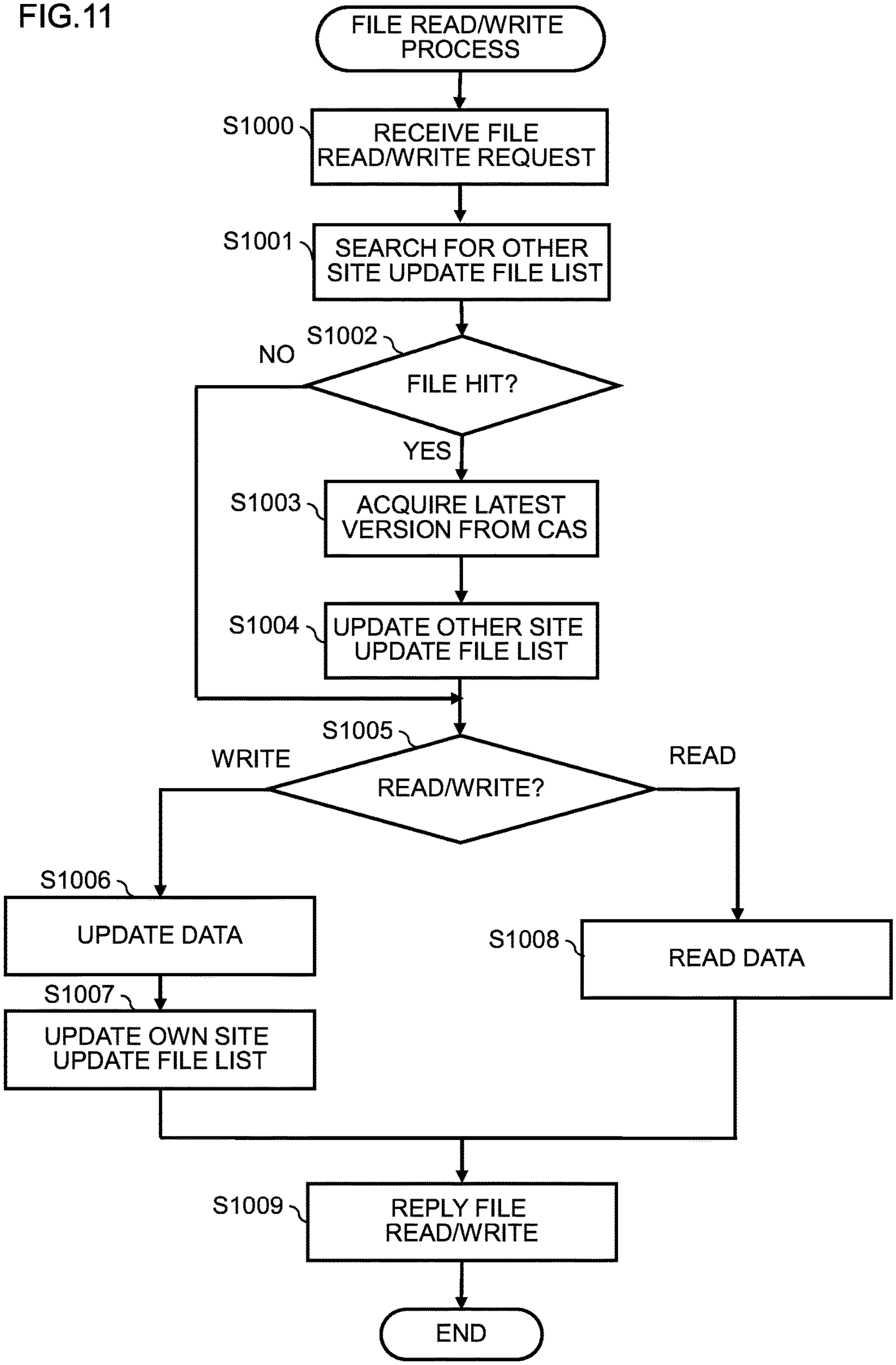
FIG. 11 is a flow chart for explaining a file read/write process according to the present invention.

FIG. 11 is a flow chart for explaining a file read/write process by the NAS device 102 according to the present invention. When receiving a file read/write request from the client 101, the NAS device 102 executes the read/write process shown in FIG. 11. Hereinafter, the process shown in FIG. 11 will be explained according to the step numbers.

Step S1000: the file system program 408 accepts the file read/write request from the client 101 via the file sharing server program 406. At this time, a read request includes the file name of a read target, and a head position and a length of a read target data in the file. On the other hand, a write request includes the file name of a write target, the head position of a write target data in the file, and a write data.

Step S1001: the file system program 408 searches for the other site update file list 414, and judges existence or nonexistence of the update in a read/write target file in the other site. The file system program 408 checks whether there are entries having the same file name as the file of the read/write target in the other site update file list 414. The present process is performed in order to determine whether the read/write target file of own site had already been updated and there is a necessity of obtaining the latest version from the CAS device 121.

Step S1002: in the case where the read/write target file is not in the other site update file list 414, then the file system program 408 moves to the process of step S1005. In this case, the file in the own site is the latest, so that an ordinary read/write is executed to the file in the FS_A200 of the own site. In the case where the read/write target file is in the other site update file list 414, then the file system program 408 moves to the process of step S1003. In this case, the file in the FS_A200 of the own site is not the latest, so that the read/write process is performed after acquiring the latest file from the CAS device 121.

Step S1003: the file sharing client program 407 reads the latest version of the read/write target file from the CAS device 121, and stores the data in the FS_A200. In the case where there is no file corresponding to the file name 414C of the other site update file list 414 in the CAS device 121, then an error is replied to the client 101, and the read/write process is ended. Such case occurs in the case where the read/write target file is deleted or renamed at the other site. In this case, the file system program 408 determines that the read/write target file is in the state of inconsistency, and prohibits access to the corresponding file until the next synchronization process.

Step S1004: the file system program 408 deletes the entry of the file acquired in step S1003 from the other site update file list 414. This is because the corresponding file in the FS_A200 in the own site is replaced by the latest file by step S1003. With the present process, CAS access becomes unnecessary for the read/write process of the corresponding file from next time on.

Step S1005: the file system program 408 determines whether the request from the client is a file read request or a file write request. The file system program 408 moves to the process of step S1008 in the case of the file read request, and moves to the process of step S1006 in the case of the file write request.

Step S1006: the file system program 408 performs the write process of the corresponding file in the FS_A200, according to the write request of the client.

Step S1007: the file system program 408 adds the update process performed in step S1006 to the own site update file list 413, and moves to the process of step S1009.

Step S1008: the file system program 408 reads the data of the read target file.

Step S1009: the file system program 408 returns the reply of the file read/write process to the client 101 via the file sharing server program 406.

With the process explained above, it becomes possible for the NAS device 102 at the time of the read/write process to reflect the update process generated at the other site, and also to reflect the update process generated in the own site to the own site update file list 413. Further, the read/write process with respect to the file explained above is applied similarly to with respect to the directory.

<File Delete/Rename Process>

In the case where the NAS device 102 received a file delete/rename request from the client, the NAS device 102 executes the delete, rename of the corresponding file in the FS_A200 of the own site. Thereafter, the NAS device 102 adds the information of the update process to the own site update file list 413. Further, at the time of the rename process, in the case where the file or the directory as the rename source, or the file or the directory inside the directory as the rename source is included in the entry of the other site update file list 414, a process of translating the corresponding entry to the path of the rename destination is performed. In this case, the path included in the file name 414C of the other site update file list 414 before rename is replaced with the path name after rename. For example, in the case where the rename process of moving /home/userA/File_A to /home/userA/File_B, and /home/userA/File_A is included in the other site update file list 414, then the file name 414C of the corresponding entry is rewritten to /home/userA/File_B.

Further, at the time of the delete process, in the case where the delete target file or the directory is included in the other site update file list 414, the corresponding file/directory is deleted.

By performing the process explained above, it becomes possible to coincide the file name 414C of the entry contained in the other site update file list 414 and the file name in the FS_A200. Further, the rename/delete process with respect to the file explained above is similarly applied to the directory.

<Synchronization Process>

Figure 12:
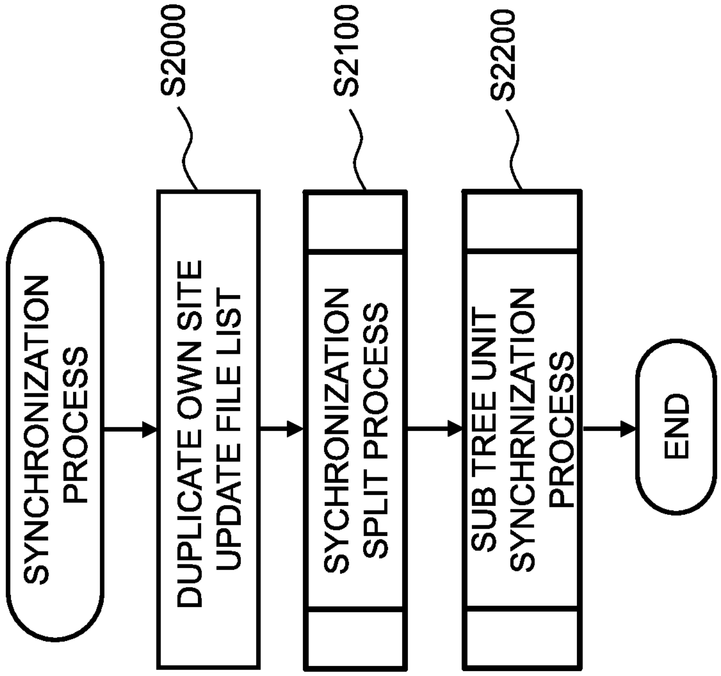
FIG. 12 is a flow chart for explaining a synchronization process according to the present invention.

FIG. 12 is a flow chart for explaining the synchronization process of the NAS device 102. Hereinafter, the process shown in FIG. 12 will be explained according to the step numbers.

Step S2000: the synchronization program 410 of the NAS device 102 is activated periodically, so as to start the synchronization process of reflecting the update process of the own site generated after the previous synchronization process to the CAS device 121. An execution interval of the synchronization process is set by the administrator, through the management screen display program 412. First, the synchronization program 410 creates the own site update file list replication, and deletes all entries of an own site update file list 413. With the present process, the file group as the synchronization target may be fixed.

Step S2100: the synchronization program 410 calls the synchronization file splitting program 411, splits the entry of the replicated own site update file list 413 into sub tree granularities according to the directory management table 416 (FIG. 8), and creates the split synchronization file list 415. With the present process, the file group as the synchronization process target may be split into sub tree granularities of a size capable of completing synchronization within the synchronization time upper limit 416D. The details of the present process will be explained later with reference to FIG. 13.

Step S2200: the synchronization program 410 performs the synchronization process to the CAS device 121, for each sub tree created in step S2100. In the present process, the NAS device 102 excludes the file system the FS_A"220 of the CAS device 121 by the sub tree granularity, and performs the synchronization process with respect to the excluded sub tree. Further, in the present process, a sequence control of the synchronization process according to the conflict frequency of the sub tree is performed. The details of the present step will be explained later with reference to FIG. 14.

With the process mentioned above, it becomes possible for the NAS device 102 to reflect the update process with respect to the FS_A200 generated after the previous synchronization process to the FS_A"220 of the CAS device 121 by the sub tree granularities.

<Details of Synchronization Split Process>

Figure 13:
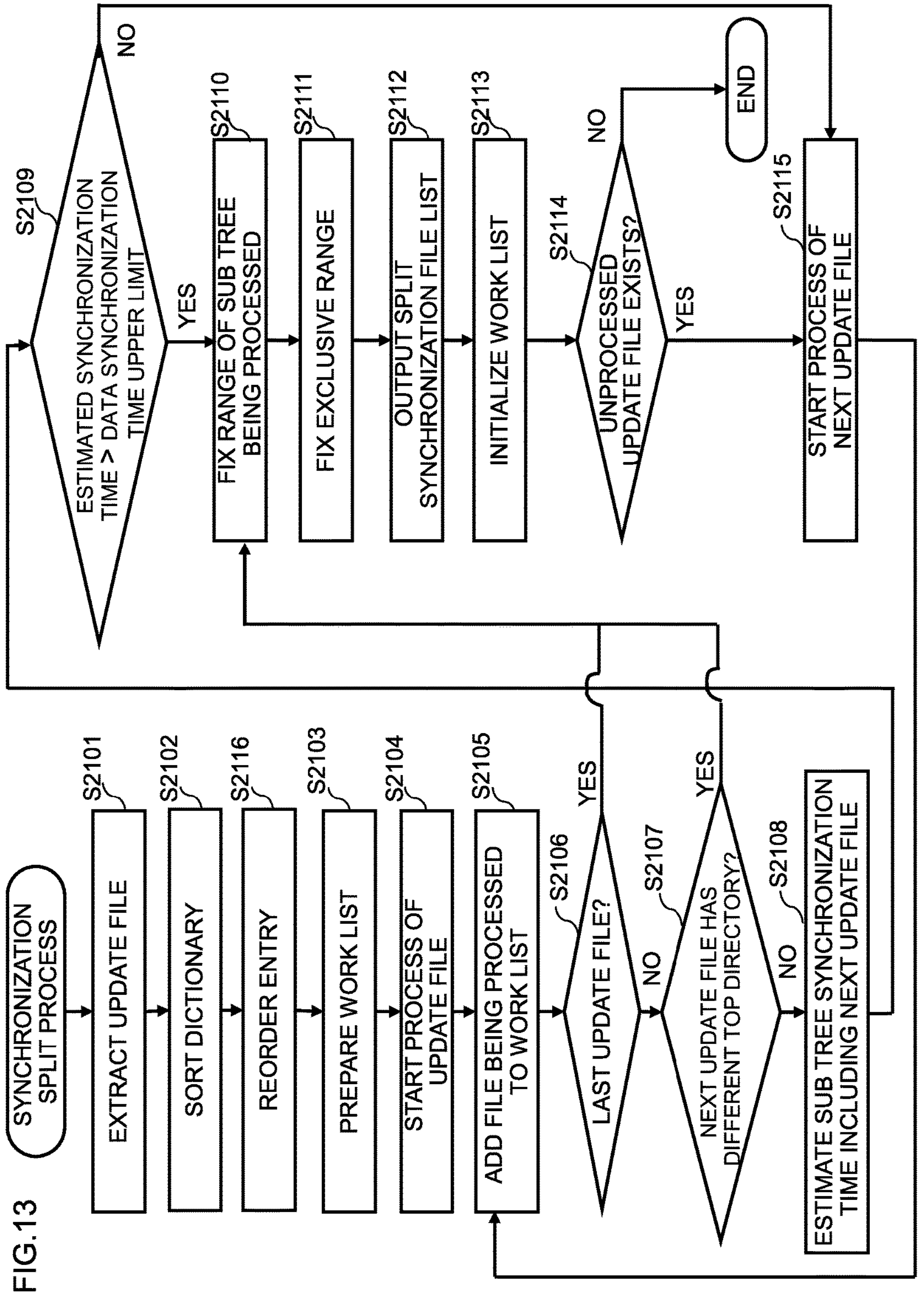
FIG. 13 is a flow chart for explaining a synchronization split process according to the present invention.

FIG. 13 is a flow chart for explaining the details of the synchronization split process discussed in step S2100. Hereinafter, the process shown in FIG. 13 will be explained according to the step numbers.

Step S2101: the synchronization file splitting program 411 reads the own site update file list replication created in step S2000, and extracts the file and the directory updated after the previous synchronization process. To the file name of the own site update file list replication, the path in the FS_A200 at the time the update process occurs is recorded. In the case where the updated file or directory, or a superior directory is renamed after the update process, the file name of the own site update file list replication and the actual path differs. Therefore, the synchronization file splitting program 411 performs a process of replacing the path name of the rename source file or directory to the path name of the rename destination file or directory, with respect to the entry before the rename process of the own site update file list replication being generated.

Step S2102: the synchronization file splitting program 411 sorts the entries included in the list of the updated file or directory extracted in step S2101 so that it becomes successive for each sub tree. The synchronization file splitting program 411 first sorts the entry by the path, and arranges the files under the same directory successively. This is because, in the file group under the same directory, a partial path until the corresponding directory coincides.

S2116: the synchronization file splitting program 411 checks the top directory of the directory management table 416. In the case where another top directory is included in one top directory, then the entries under the other top directory is arranged after the entry of the corresponding top directory.

Step S2103: the synchronization file splitting program 411 creates a work list, as a work area for creating the sub tree. The work list is a list for storing a reference pointer of the file to be included in the sub tree under formulation.

Step S2104: the synchronization file splitting program 411 selects the first entry of the process target file list created in step S2102 as the target file (processing file) of the synchronization split process. At this time, the synchronization file splitting program checks the directory management table 416, and checks the top directory that the processing file belongs to.

Step S2105: the synchronization file splitting program 411 adds the processing file to the work list.

Step S2106: in the case where the current processing file is the last file in the process target file list, the synchronization file splitting program 411 determines that the processing file is the last file in the sub tree, and moves to the process of step S2110. If not, then the synchronization file splitting program 411 moves to the process of step S2107.

Step S2107: the synchronization file splitting program 411 checks whether the next file in the process target file list is included in the same top directory as the current processing file. The top directory referred to this explanation corresponds to the top directory 416A of the directory management table 416. In the case where it is not included in the same top directory, then the synchronization file splitting program 411 determines that the processing file is the last file in the sub tree, and moves to the process of step S2110. If not, then the synchronization file splitting program 411 moves to the process of step S2108.

Step S2108: the synchronization file splitting program 411 performs an estimation of the synchronization time in the case where the files included in the work file list and the next process target file, using the following equation 1.

Estimation of synchronization time=((sum of file size included in work file list)+file size of next process target file)/average throughput     Equation 1

As the average throughput, the value of the average throughput 416E listed in the directory management table 416 is used.

Step S2109: the synchronization file splitting program 411 judges whether the synchronization time estimation obtained in S2108 is larger than the synchronization time upper limit 416D of the top directory that the processing file belongs. In the case where the synchronization time estimation is larger than a data synchronization time upper limit 416D, the synchronization file splitting program 411 determines that the processing file is the last file in the sub tree, and moves to the process of step S2110. If not, then the synchronization file splitting program 411 moves to the process of step S2115.

Step S2110: the synchronization file splitting program 411 creates the sub tree as the synchronization target, from the files included in the work list. Of the tree structure of the file system, the sub tree is a minimum sub tree including all the files included in the work list. It is guaranteed in step S2107 that the file within the same top directory does not exist, so that the maximum sub tree becomes the top directory.

Step S2111: the synchronization file splitting program 411 sets the sub tree created in S2110 as the exclusive range. Further, the synchronization file splitting program 411 checks the own site update file list replication, and in the case where the file or the directory in the sub tree being created is renamed from outside the sub tree, then sets the path of the rename source as the exclusive range. This is to prevent the file or the directory of the rename source from being updated by the synchronization process of the other side, at the time of synchronization process.

Step S2112: the synchronization file splitting program 411 outputs entries in the work list to the split synchronization file list 415 for each sub tree determined in step S2110. The synchronization file splitting program 411 allocates a unique sub tree number in the synchronization process to each sub tree, and outputs the same to the sub tree number 415A. Further, the exclusive range determined in step S2111 is output to the exclusive range 415B. The synchronization file splitting program 411 stores the path of the updated file checked in step S2101 to the file name 415C, and stores the content of the own site update file list 413 to the update time and date 415D, the update target 415E, and the update content 415F.

Step S2113: the synchronization file splitting program 411 initializes the work list, and starts creation of the next sub tree.

Step S2114: in the case where the unprocessed update file exists in the file group as the synchronization target, the synchronization file splitting program 411 moves to the process of step S2115, and if not, then ends the synchronization split process.

Step S2115: the synchronization file splitting program 411 performs the process after step S2105 to the next update file of the file group as the synchronization target.

By performing the synchronization split process explained above, the NAS device 102 may split the synchronization process as large as possible within the range satisfying the synchronization time upper limit 416D.

<Details of Sub Tree Granularity Synchronization Process>

Figure 14:
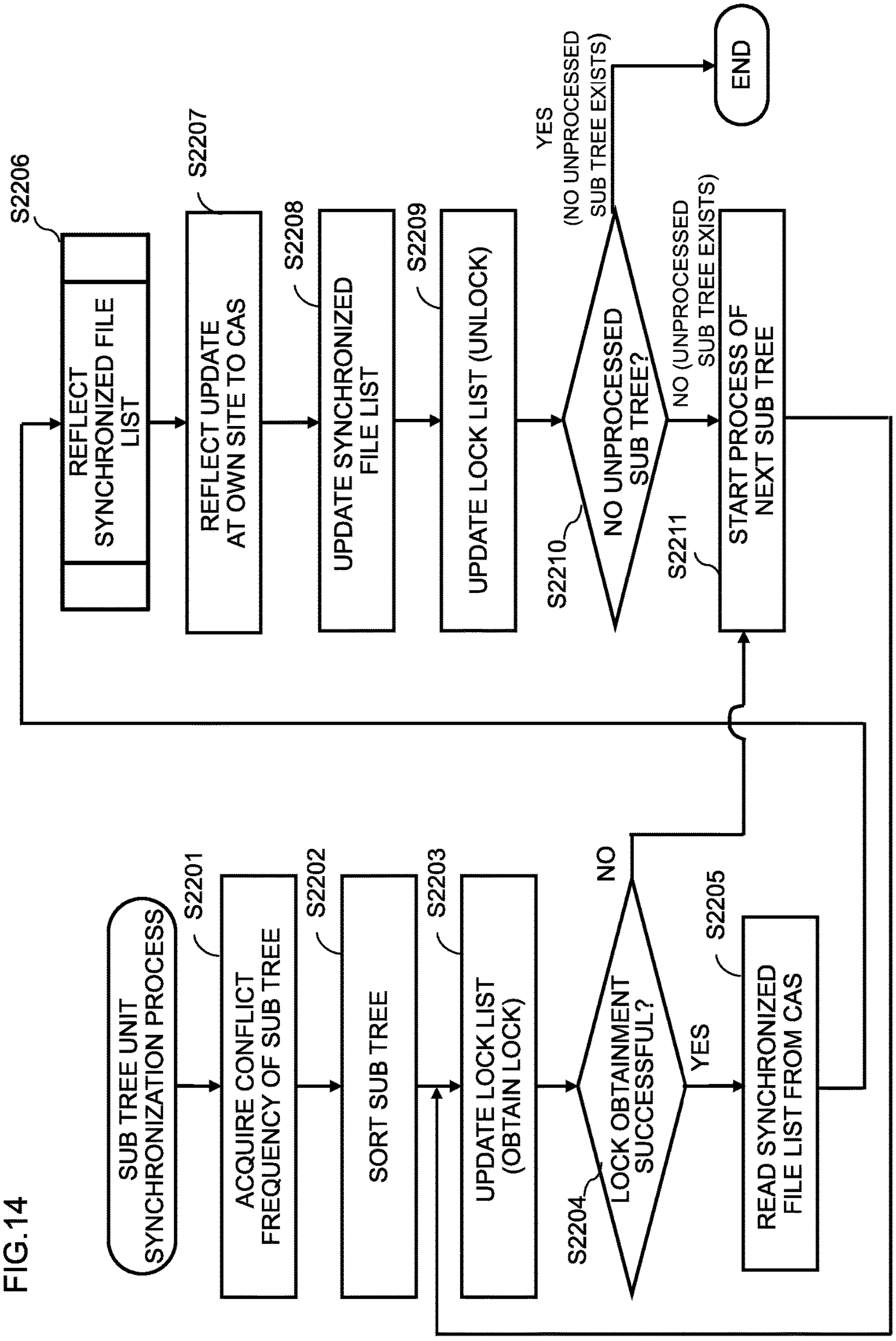
FIG. 14 is a flow chart for explaining a sub tree granularity synchronization process according to the present invention.

FIG. 14 is a flow chart for explaining the sub tree granularity synchronization process discussed in step S2200. Hereinafter, the process shown in FIG. 14 will be explained according to the step numbers.

Step S2201: the synchronization program 410 checks the split synchronization file list 415 and the directory management table 416, and checks the conflict frequency 416C of each sub tree. An update frequency of the sub tree is determined as being equivalent to the conflict frequency 416C of the top directory 416A including the sub tree.

Step S2202: on the basis of the conflict frequency checked in S2201, the synchronization program 410 sorts the sub tree from the ones having high conflict frequency. If a plurality of the sub trees with identical conflict frequency exist, then priority is given to the sub tree with smallest sum of the file size in the sub tree. By doing so, synchronization to other site may be started from the file having high conflict frequency, so that the probability of conflict may be reduced.

Step S2203: the synchronization program 410 checks the lock list 510 of the CAS device 121, and determines whether or not it is possible to obtain the lock with respect to the exclusive range 415B of the sub tree as the process target. It is determined that the lock is obtainable, only in the case where all the sub tree roots 510A in the lock list 510 are not included in the exclusive range 415B.

In the case where the lock is obtainable to all the exclusive range 415B, the synchronization program 410 adds the entry setting the exclusive range 415B as the sub tree root 510A, and itself as the lock owner 510B to the lock list 510. Further, the executing time and date of the present process is designated to the obtainment time and date 510C, and a period set beforehand to the system (for example, the value designated in the synchronization time upper limit 416D) is designated to the retention period 510D.

In order to exclude the update process with respect to the lock list 510 from the other site, the NAS device 102 creates a lock file of a specific name to which itself solely has an update permission on the CAS device 121, at the time of starting operation of the lock list 510. As soon as the operation to the lock list 510 is completed, the NAS device 102 deletes the lock file. During the time the lock file exists, the other site does not perform operation of the lock list 510.

Step S2204: in the case where the lock obtainment is successful in step S2203, the synchronization program 410 moves to step S2205 in order to synchronize the processing sub tree to the CAS device 121. In the case where the lock obtainment is unsuccessful, then the synchronization program 410 moves to step S2211, and moves to the process of the next sub tree.

Step S2205: the synchronization program 410 reads the synchronized file list 509 from the CAS device 121.

Step S2206: the synchronization program 410 reflects the content of the synchronized file list 509 read in step S2205 to the file system FS_A200 and the other site update file list 414. Further, in the case where the rename/delete process is included in the synchronized file list 509, the contents thereof is reflected to the own site update file list 413 and the split synchronization file list 415. The details of a synchronized file list reflection process will be explained later with reference to FIG. 15.

Step S2207: the synchronization program 410 performs the synchronization process of reflecting the update process with respect to the processing sub tree in the split synchronization file list 415 to the CAS device 121. The synchronization program 410 reads the split synchronization file list 415, and performs the equivalent process as the file update process in the sub tree performed after the previous synchronization process to the CAS device 121. In the case where the update content 415F is write, then the synchronization program 410 stores the file as the update target to the CAS device 121. Further, in the case where the update content 415F is rename/delete, then the synchronization program 410 executes the same process with respect to the CAS device 121.

In the file name 415C of the split synchronization file list 415, the path name in the FS_A200 at the time of the update process is recorded. Therefore, similarly to step S2101, the process for translating the file name 415C to the path in the FS_A200 at the time of synchronization process is performed. Further, in the case where the rename process is generated at the other side, then the file name 415C is recorded in a different path in the FS_A"220. Therefore, the process of checking the rename process generated after the previous synchronization process from the synchronized file list 509, and translating the file name 415C to the path of the FS_A"220 is also performed. The update process is executed to the file/directory of the FS_A"220 obtained finally.

Step S2208: the synchronization program 410 adds the update process to the CAS device 121 performed in step S2207 to the synchronized file list 509 on the CAS device 121. The update process to the synchronized file list 509 is performed excluding the other site, in a similar method as step S2203.

Further, the synchronization program 410 records a cumulative transfer amount and transfer time of the sub tree as the statistic information, and calculates the average transfer throughput. The synchronization program 410 records the average transfer throughput to the average throughput 416E of the directory management table 416.

Step S2209: the synchronization program 410 deletes the entry added in step S2203 from the lock list 510 of the CAS device 121, and unlocks the same. Similarly to step S2203, the operation of the lock list 510 is performed excluding the other site.

Step S2210: in the case where the unprocessed sub tree exists, the synchronization program 410 moves the process to S2211 for the process of next sub tree, and if not, then ends the synchronization process.

Step S2211: the synchronization program 410 selects the sub tree of the unprocessed sub trees with the highest conflict frequency as the next sub tree, and repeats the processes after step S2203.

By performing the sub tree granularity synchronization process explained above, it becomes possible to sequentially execute the synchronization process of sub tree granularity from the sub tree with high conflict frequency. In the present embodiment, the lock is obtained and released in each synchronization process of the sub tree, but this is just an exemplification. For example, in order to reduce a communication amount from the lock obtainment, a control of obtaining the lock of a plurality of sub trees at once, with respect to the sub trees with low conflict frequency, is possible. In this case, the synchronization program 410 performs the lock release for the sub trees, after executing the synchronization process with respect to all the sub trees. In this case, the lock may be obtained collectively to the sub trees under different top directories, and the lock target may be set in more detail than varying the range of the sub tree. In this case, the decision on the collecting range of the plurality of locks may be made taking into consideration the time related to synchronization, in addition to the conflict frequency explained above. Further, this decision may be made, for example at the phase of sorting the sub tree in S202.

<Details of Synchronized File List Reflection Process>

Figure 15:
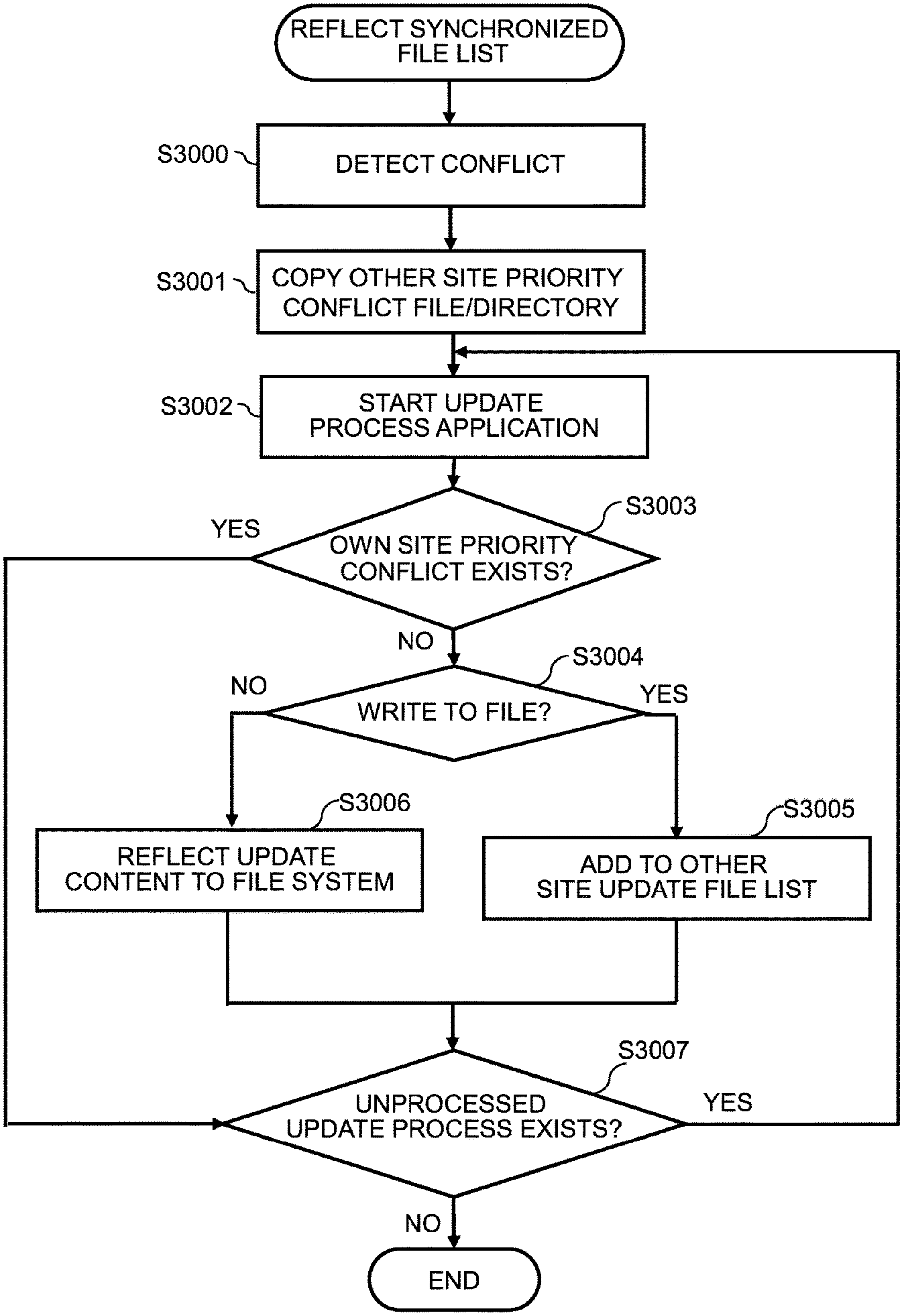
FIG. 15 is a flow chart for explaining a synchronized file list reflection process according to the present invention.

FIG. 15 is a flow chart for explaining the details of the synchronized file list reflection process of the CAS device 121. Hereinafter, the process shown in FIG. 15 will be explained according to the step numbers.

Step S3000: the synchronization program 410 checks the update process of the synchronized file list 509 read in step S2205 with respect to the CAS device 121 generated after the previous synchronized process performed by itself and which is included in the update process included in the processing sub tree. Thereafter, the synchronization program 410 checks whether the process target file of the update process performed in the CAS device 121 is included in the own site update file list 413, and determines the existence or nonexistence of the conflict.

In the case where a conflict exists, then the corresponding update process is extracted as a conflict process. At this time, if the update time and date 413B of the own site is older than the update time and date 509D of the other site, the update process is processed as another site priority conflict. In other cases, the update process is processed as an own site priority conflict. Further, the rename process/delete process is similarly judged whether it is the own site priority conflict or the other site priority conflict. In the case where the rename process is generated beforehand in both the own site update file list 413 and the synchronized file list 509, then it is determined whether it is the same file, after translating the file names of the entries thereafter to the file names before rename.

Step S3001: the synchronization program 410 copies the file or the directory as the process target of the other site priority conflict found in step S3000 to a special backup directory. The backup directory is a directory for storing conflict generating files, and is one system directory prepared for each file system. By backing up the other site priority conflict file, it becomes possible for the user to access the old (before replacement) file, even in the case where a conflict resolve process not intended by the user is generated and the file is replaced. Further, the synchronization program 410 determines that the update process in which the other site priority conflict is generated is not necessary to synchronize to the CAS device 121, and deletes the corresponding entry from a split synchronization file list 415.

Step S3002: the synchronization program 410 selects the first entry of the process target entries in the synchronized file list 509 found in step S3000 as the next process target, and moves to the process of step S3003.

Step S3003: in the case where the update process in process is the own site priority conflict, then the synchronization program 410 determines that it is not necessary to reflect the update process of the other site, and moves to the process of step S3007. If not, then the synchronization program 410 moves to the process of step S3004.

Step S3004: the synchronization program 410 determines, on the basis of the update content 509F, whether the update process is the writing with respect to the file and the directory, the deleting, or the rename process. In the case where the update process is the writing, then the synchronization program 410 moves to the process of step S3005, and if not, then moves to the process of step S3006.

Step S3005: the synchronization program 410 adds to the other site update file list 414 the update target file 509C of the update process currently being in process. By the present process, it becomes possible for the file system program 408 to determine whether or not the file or the directory as the access target is in the newest condition, by referring to the other site update file list 414. In the case where the rename is generated with respect to the update target file or the superior directory in the own site or the other site, there are cases where the file name 509C in the synchronized file list 509 and the path in the file system FS_A200 differs. In this case, after the file name is converted to the path in the FS_A200, it is registered to the other site update file list 414.

Step S3006: the synchronization program 410 performs the delete/rename process of the synchronized file list 509 with respect to the file system FS_A200. In the case where the rename process is generated in the own site or the other site before these processes, similarly to the case of step S3005, the process is performed with the path in the FS_A200.

Step S3007: in the case where there are unprocessed update process, of the update process with respect to the process target sub tree of the synchronized file list 509, the synchronization program 410 repeats the processes after step S3002, and if not, ends the updated file list reflection process.

By performing the synchronized file list reflection process explained above, it becomes possible to reflect the update process generated in the other site to the own site.

<Exported Directory Setting Interface>

Figure 16:
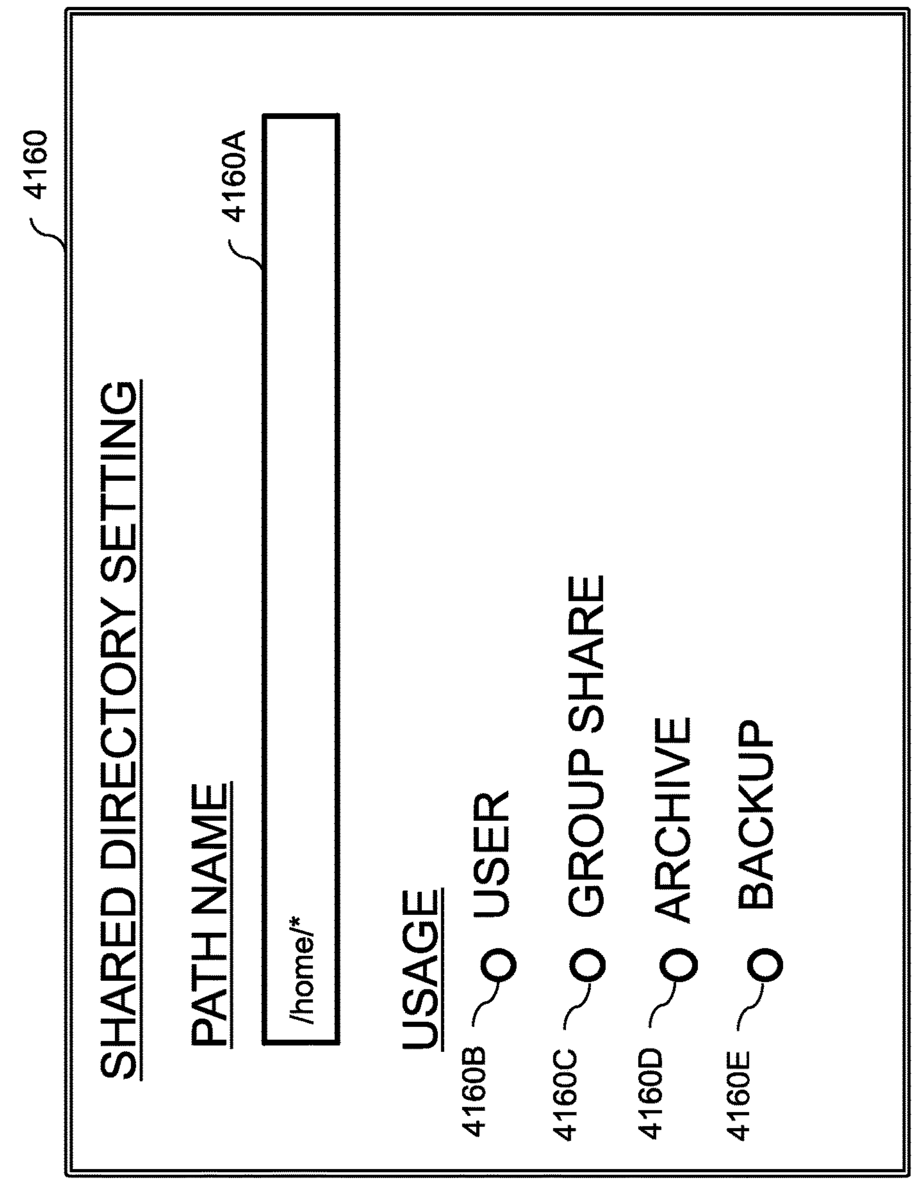
FIG. 16 is a view showing an example of the configuration of an exported directory setting interface.

FIG. 16 is an outline view showing a management interface for setting the directory to be exported to the client 101.

An exported directory setting interface 4160 is provided to the administrator by the management screen display program 412 through the client 101. The administrator may set the content of the directory management table 416, by designating the usage when setting the exported directory of FS_A200.

The exported directory setting interface 4160 is configured from a text input box 4160A and check boxes 4160B through 4160E.

The text input box 4160A is a text input box for setting the path name of the directory to be exported. An asterisk "*" may be used in the text input box 4160A. The input content of the text input box 4160A corresponds to the top directory 416A of the directory management table 416.

The check boxes 4160B through 4160E are check boxes for designating the usage of the directory input to the text input box 4160A. In the case where any one of the check boxes are designated, the other check boxes are invalidated. The check boxes 4160B through 4160E respectively correspond to the values capable of being designated in the directory management table 416. Further, although not illustrated, it is possible to set the path name in the text input box 4160A and show the use, the conflict frequency, and the upper limit of the data synchronization process time corresponding to the set path name. Further, in FIG. 16, explanation is given to setting the usage at the timing of the top directory exportation. However, similar management interface may be provided to the administrator, for setting the usage of the directory or the file under the top directory. Further, the management interface may be provided to the administrator in accordance with the request transmitted from the client, so that in the case of exporting the directory under the top directory as a shared directory, then the management interface may be provided to set at the timing of the directory exportation, and in the case where the directory is not exported as the shared directory, then the same may be arbitrarily set during operation. Similarly, for the files, the management interface may be provided to the administrator in accordance with the request transmitted from the client to arbitrarily set the same during operation.

According to the present embodiment, by splitting the synchronization process in a multi-site file system sharing via a data center, it becomes possible to execute the synchronization process in parallel between a plurality of the sites.

Further, in the present embodiment, the synchronization of the files of the usage with low conflict frequency in a large sub tree granularity. As a result, it becomes possible to reduce the lock obtainment numbers, and to suppress the throughput degradation by the overhead of the synchronization process splitting.

Further, by using the present invention, it becomes possible to reduce the data synchronization delay time between a plurality of the sites, while suppressing the throughput degradation of the data synchronization by the lock obtainment. As a result, a larger number of sites may be supported.

In the present embodiment, the sub tree granularity is calculated from the usage, the conflict frequency, the size of the directory or the file, the synchronization upper limit time, and the average throughput and the like. However, it is not necessary to always add all these elements. For example, in the case where the top directory is the user usage, then the whole top directory may be determined as one sub tree. This is because, in the case of the top directory for the user, the user accessing the same is one person, so that it is unlikely for the scene in which the update from the other site is generated during update in one site to occur, so that a problem is hardly generated even when the whole top directory is locked for a long period of time. By determining this way, it becomes possible to perform the decision of the sub tree easily, and to realize the synchronization process with shorter period of time.

Further, in the present embodiment, the excluding of the synchronization process in sub tree granularities between the sites are executed. However, this is just an exemplification. For example, for the sub trees of low conflict frequency, the exclusive control for the file update from the clients may be performed. In this case, if the file update occurs in one site, then the update from other side to the corresponding sub-tree is forbidden until the updated contents are synchronized to the data center. In this case, the conflict dissolving process becomes unnecessary at the time of synchronization process, so that the synchronization process of the corresponding sub tree may achieve higher throughput.

(2) Second Embodiment

Hereinafter, a second embodiment of the present invention will be explained.

In the first embodiment of the present invention, the NAS device 102 estimated the conflict frequency of the file from the usage of the exported directory set by the administrator, and decided the upper limit of the synchronization process time. On the other hand, in the second embodiment of the present invention, the NAS device 102 estimates the conflict frequency of the file, on the basis of statistics information on the number of conflict occurrence during the synchronization process.

By using the second embodiment, it becomes possible to decide the upper limit of the appropriate data synchronization process time, without the administrator inputting the usage when creating the directory.

In the following explanation, the difference between the first embodiment will be mainly explained, and the explanation on the common points with the first embodiment will be abbreviated or simplified.

<Directory Management Table>

In the second embodiment, the management of the usage 416B is not performed in the directory management table 416, and the conflict frequency 416C and the synchronization time upper limit 416D are set on the basis of the statistics information.

Hereinafter, a difference between the first embodiment will be explained with reference to FIG. 8.

The synchronization program 410 updates the conflict frequency 416C and the synchronization time upper limit 416D, on the basis of the average number of conflict per synchronization process. For example, in the case where the average conflict frequency per synchronization process is one or lower, then the conflict frequency 416C is set to "low", where it is three or more, then the conflict frequency is set to "high", and in other cases, then it is set to "medium". Further, a value set beforehand with respect to the conflict frequency is used for the synchronization time upper limit. For example, when the conflict frequency is "low", then the synchronization time upper limit is set to "one hour", when it is "medium", then it is set to "30 minutes", and when it is "high", then it is set to "5 minutes".

<Synchronized File List Reflection Process>

In the second embodiment, the synchronization program 410 obtains the statistics information of the conflict frequency between the sites, in the synchronized file list reflection process. Hereinafter, explanation is given on the difference in FIG. 15.

Step S3000: the synchronization program 410 records, at the time of conventional conflict detection execution, the number of conflicts for each top directory 416A of the directory management table 416. In the case where the average number of conflicts increases or decreases and there is a change in the conflict frequency 416C, the values of the conflict frequency 416C and the synchronization time upper limit 416D of the directory management table 416 will be updated.

<Exported Directory Setting Interface>

In the second embodiment, it is not necessary for the administrator to input the usage at the time of setting the exported directory. That is, the check boxes 4160B through 4160E in FIG. 16 become unnecessary.

As is explained above, in the second embodiment, it becomes possible to estimate the conflict frequency, without the administrator inputting the usage, by the NAS device 112 obtaining the statistics information of the conflict frequency between sites. As a result, it becomes possible to reduce the management cost by the administrator, and to apply the present invention with respect to the directories which is difficult to estimate the usage of the files beforehand.

Further, as another embodiment, a manner of determining whether or not to enabling the file update from a plurality of the sites, with respect to the file under the top directory, by referring to the usage in 416B input by the user, and the conflict frequency in 416C. Specifically, the file update from a plurality of the sites are enabled for the files under the top directory in which the conflict possibility is low. However, for the files under the top directory in which the conflict possibility is high, the file update from a plurality of the sites are disabled, the file update from one specific site is enabled, and only reference is enabled to the other sites. In this case, splitting of the update file into the sub tree granularity in the first embodiment is performed only to those with low conflict possibility. This is because there is no need to obtain the lock to files in which file update is disabled from a plurality of the sites, and there is no need to decide the sub tree as the range thereof. Since the number of directories necessary to decide the range of the sub tree is reduced, it becomes possible to perform the synchronization promptly.

REFERENCE SIGNS LIST

10 Information processing system
100 Site A (first sub computer system)
110 Site B (second sub computer system)
101, 111 Client
102, 112 NAS device (NAS)
105, 115 Data access network
120 Data center
121 CAS device (CAS)
122 CAS controller
123 Storage device
124 Management terminal
125 Management network
130, 140 Back end network
200 File system FS_A
210 File system FS_A'
220 File system FS_A"
406 File sharing server program
407 File sharing client program
408 File system program
409 Operating system
410 Synchronization program
411 Synchronization file splitting program
412 Management screen display program
413 Own site update file list
413A File name
413B Update time and date
413C Update target
413D Update content
414 Other site update file list
414A Site
414B Synchronization number
414C File name
414D Update time and date
414E Update target
415 Split synchronization file list 415A Sub tree number
415B Exclusive range
415C File name
415D Update time and date
415E Update target
415F Update content
416 Directory management table
416A Top directory
416B Usage
416C Conflict frequency
416D Synchronization time upper limit
416E Average throughput
509 Synchronized file list
509A Site
509B Synchronization number
509C File name
509D Update time and date
509E Update target
509F Update content
510 Lock list
510A Sub tree root
510B Lock owner
510C Obtainment time and date
510D Retention period

The invention claimed is:

1. An information processing system, comprising:

a plurality of first computers and a second computer connected to the plurality of the first computers, each of the plurality of first computers comprise a first controller and a first storage media, and the second computer comprises a second controller and a second storage media, wherein each of the plurality of first computers are respectively connected to a third computer, wherein each first controller stores a file transmitted from the respectively connected third computer in the respective first storage media, wherein the second controller stores a file transmitted from a first computer, among the plurality of first computers, in the second storage media, the file being updatable by the first computer, wherein as a data synchronization process of reflecting a file update in an update reflection source first computer, which is the first computer among the plurality of first computers, to the second computer, the first controller of the update reflection source first computer splits a data synchronization process target group into a plurality of file sub trees, and executes the data synchronization for each file sub tree, wherein the file update process is executed while prohibiting, with respect to the file sub tree related to the file update, a file update from the first computers other than the update reflection source first computer until the completion of the data synchronization, wherein the data synchronization process is executed while prohibiting, with respect to a storage area in the second storage media in which an update content of the file sub tree is reflected, data synchronization from the first computers other than the update reflection source first computer, and wherein the file sub tree is determined so that a process time for one data synchronization becomes equal to or less than an upper limit time of the data synchronization process.

2. The information processing system according to claim 1, wherein the file sub tree is determined so as to be equal to or smaller than a data capacity, which is calculated by multiplying an average transfer rate between the update reflection source first computer and the second computer by the upper limit time of the data synchronization process.

3. The information processing system according to claim 1, wherein a conflict frequency, in which the update is performed with respect to an identical file by the update reflection source first computer and one or more of the first computers among a plurality of the first computers excluding the update reflection source first computer, is determined by the usage of the directory or the file constituting the data synchronization process target group preliminarily stored in the update reflection source first computer.

4. The information processing system according to claim 1, wherein a plurality of the first computers each comprises a management interface operating on the first controller for executing an information setting to a plurality of the first computers or an information output on a plurality of the first computers, and the management interface is transmitted to the third computer, and the usage of the directory or the file constituting the data synchronization process target group preliminarily stored in a plurality of the first computers is input with the management interface.

5. An information processing system, comprising:

a plurality of first computers and a second computer connected to the plurality of first computers, each of the plurality of first computers comprise a first controller and a first storage media, and the second computer comprises a second controller and a second storage media, wherein each of the plurality of first computers are respectively connected to a third computer, wherein each first controller stores a file transmitted from the respectively connected third computer in the respective first storage media, wherein the second controller stores a file transmitted from a first computer, among the plurality of first computers, in the second storage media, the file being updatable by the first computer, wherein as a data synchronization process of reflecting a file update in an update reflection source first computer, which is the first computer among the plurality of first computers, to the second computer, the first controller of the update reflection source first computer splits a data synchronization process target group into a plurality of file sub trees, and executes the data synchronization for each file sub tree, and wherein the data synchronization process is executed from the file of the file sub tree having a high frequency of a conflict, in which the update is performed with respect to an identical file by the update reflection source first computer and one or more of the first computers among a plurality of the first computers excluding the update reflection source first computer.

6. The information processing system according to claim 5, wherein in a case where a plurality of file sub trees having a same conflict frequency exist, then the data synchronization process is executed giving priority to the file sub tree having small data size.

7. An information processing system, comprising:

a plurality of first computers and a second computer connected to the plurality of the first computers, each of the plurality of first computers comprise a first controller and a first storage media, and the second computer comprises a second controller and a second storage media, wherein each of the plurality of first computers are respectively connected to a third computer, wherein each first controller stores a file transmitted from the respectively connected third computer in the respective first storage media, wherein the second controller stores a file transmitted from a first computer, among the plurality of first computers, in the second storage media, the file being updatable by the first computer, wherein as a data synchronization process of reflecting a file update in an update reflection source first computer, which is the first computer among the plurality of first computers, to the second computer, the first controller of the update reflection source first computer splits a data synchronization process target group into a plurality of file sub trees, and executes the data synchronization for each file sub tree, wherein the first controller of the update reflection source first computer splits the data synchronization process target group into a plurality of the file sub trees on the basis of any of:

(1) a usage of a directory constituting the data synchronization process target group preliminarily stored in the update reflection source first computer;

(2) a usage of the file preliminarily stored in the update reflection source first computer;

(3) a process time per one data synchronization as an upper limit time of the data synchronization process; and (4) a data capacity calculated by multiplying an average transfer rate between the update reflection source first computer performing the data synchronization process and the second computer, and the upper limit time of the data synchronization process; and wherein the data synchronization process:

executes the data synchronization from the file sub tree having a high frequency of a conflict, in which the update is performed with respect to an identical file by the update reflection source first computer and one or more of the first computers among a plurality of the first computers excluding the update reflection source first computer;

in a case where a plurality of file sub trees having a same conflict frequency exist, then executes the data synchronization giving priority to the file sub tree having a small data size;

determines whether or not the reflection of the file sub tree update content to the second computer is possible;

and in a case where it is decided that the reflection is possible, prohibits access with respect to a storage area in the second computer in which the file sub tree update content is reflected, from the first computers other than the update reflection source first computer, in a case where a comparison of an update time of a conflict file of the update reflection source first computer and an update time of a conflict file of the second computer reveals that the update time of the first computer is older, then backup the file of the file sub tree of the second computer to a different storage area from the storage area in which the file of the file sub tree is stored, and releases the prohibition of access in a case where the time prohibiting the access exceeds an upper limit of a prohibition time preliminarily set; and in a case where it is decided that the reflection is not possible, executes the data synchronization of file sub trees other than the file sub tree.

* * * * *